United States Patent
O'Keene

(10) Patent No.: US 7,891,622 B1
(45) Date of Patent: Feb. 22, 2011

(54) ADJUSTABLE TILT MOUNTING SYSTEM

(75) Inventor: Dugan O'Keene, Forest Park, IL (US)

(73) Assignee: Peerless Industries, Inc., Aurora, IL (US)

( * ) Notice: Subject to any disclaimer, the term of this patent is extended or adjusted under 35 U.S.C. 154(b) by 64 days.

(21) Appl. No.: 12/012,365

(22) Filed: Jan. 31, 2008

Related U.S. Application Data

(60) Provisional application No. 60/899,071, filed on Feb. 2, 2007.

(51) Int. Cl.
*E04G 3/00* (2006.01)

(52) U.S. Cl. .................. 248/292.13; 248/121; 248/126; 248/919; 248/922; 248/923; 248/201; 248/291.1; 248/276.1; 248/292.14; 248/299.1; 248/284.1; 248/286.1; 248/287.1; 248/298.1; 248/924; 248/917; 248/918; 248/920; 248/921; 16/358

(58) Field of Classification Search ............ 248/292.13, 248/121, 126, 919, 922, 923, 201, 284.1, 248/291.1, 276.1, 292.14, 299.1, 286.1, 287.1, 248/298.1, 917, 918, 920, 921, 924; 16/358
See application file for complete search history.

(56) References Cited

U.S. PATENT DOCUMENTS

| | | | |
|---|---|---|---|
| 212,618 A | 2/1879 | Miller | |
| 257,050 A | 5/1882 | Munson | |
| 1,282,489 A | 10/1918 | Strodel | |
| 1,574,227 A | 2/1926 | Andersen | |
| 1,628,218 A | 5/1927 | Beauchamp | |
| 1,977,153 A | 10/1934 | Spence, Jr. | |
| 2,233,882 A | 3/1941 | Bobek | |
| 2,466,219 A | 4/1949 | Farrell et al. | |
| 2,734,708 A | 2/1956 | Cohn | |
| 3,001,225 A * | 9/1961 | Squire | 16/287 |
| 3,182,946 A | 5/1965 | Dudko | |
| 3,574,340 A | 4/1971 | Busche | |
| 4,483,803 A | 11/1984 | Rizkalla | |
| 4,554,590 A | 11/1985 | Chelin et al. | |
| 4,560,129 A | 12/1985 | Clayton | |
| 4,645,153 A | 2/1987 | Granzow et al. | |

(Continued)

FOREIGN PATENT DOCUMENTS

EP    1 590 595    1/2007

(Continued)

OTHER PUBLICATIONS

"Installation and Assembly: OneMount™," Peerless Industries, Inc., 2006.

(Continued)

*Primary Examiner*—Anita M King
*Assistant Examiner*—Nkeisha J Smith
(74) *Attorney, Agent, or Firm*—Foley & Lardner LLP

(57) ABSTRACT

An improved tilt mounting system for mounting flat panel televisions and similar devices or displays. In various embodiments, at least one mounting bracket includes a plurality of guide mechanisms that are adjustable in orientation relative to each other. When the guide mechanisms are adjusted, the angle between guide structures contained therein changes. As the angle between the guide structures increases, the mounting system becomes more suitable for larger devices or display.

29 Claims, 3 Drawing Sheets

U.S. PATENT DOCUMENTS

| | | |
|---|---|---|
| 4,718,317 A | 1/1988 | Hensler |
| 4,814,759 A | 3/1989 | Gombrich et al. |
| 4,934,645 A | 6/1990 | Breslow |
| 5,037,050 A | 8/1991 | Lin et al. |
| 5,040,759 A | 8/1991 | Wainwright |
| 5,139,223 A | 8/1992 | Sedighzadeh |
| 5,165,644 A | 11/1992 | Allen |
| 5,195,900 A | 3/1993 | Kumagai et al. |
| 5,322,255 A | 6/1994 | Garrett |
| 5,344,194 A | 9/1994 | Hatagishi et al. |
| D361,062 S | 8/1995 | Iino et al. |
| D361,068 S | 8/1995 | Brehmer et al. |
| 5,465,557 A | 11/1995 | Harte |
| 5,520,361 A | 5/1996 | Lee |
| 5,553,820 A | 9/1996 | Karten et al. |
| 5,582,375 A | 12/1996 | Martin |
| 5,584,735 A | 12/1996 | McMath |
| 5,634,622 A | 6/1997 | Pye |
| 5,664,752 A | 9/1997 | Matthiessen et al. |
| 5,713,549 A | 2/1998 | Shieh |
| 5,743,503 A | 4/1998 | Voeller et al. |
| 5,751,548 A | 5/1998 | Hall et al. |
| 5,768,648 A | 6/1998 | Skipp et al. |
| D395,892 S | 7/1998 | Solomon |
| 5,797,568 A | 8/1998 | Canton Gongora et al. |
| 5,842,672 A | 12/1998 | Sweere et al. |
| 5,854,735 A | 12/1998 | Cheng |
| 5,914,493 A | 6/1999 | Morita et al. |
| 5,918,841 A | 7/1999 | Sweere et al. |
| 5,924,665 A | 7/1999 | Sweere et al. |
| 5,941,493 A | 8/1999 | Cheng |
| 5,941,497 A * | 8/1999 | Inoue et al. ................ 248/514 |
| 5,947,429 A | 9/1999 | Sweere et al. |
| D415,768 S | 10/1999 | Howell |
| 5,992,809 A | 11/1999 | Sweere et al. |
| 6,012,693 A | 1/2000 | Voeller et al. |
| 6,015,120 A | 1/2000 | Sweere et al. |
| 6,019,332 A | 2/2000 | Sweere et al. |
| 6,036,337 A | 3/2000 | Belfer |
| 6,042,068 A | 3/2000 | Tcherny |
| 6,045,103 A | 4/2000 | Costa et al. |
| 6,047,939 A | 4/2000 | Kim |
| 6,048,013 A | 4/2000 | Moilanen et al. |
| 6,068,227 A | 5/2000 | Morgan et al. |
| 6,102,348 A | 8/2000 | O'Neill |
| 6,113,047 A | 9/2000 | Wung et al. |
| 6,126,128 A | 10/2000 | Costa et al. |
| 6,189,850 B1 | 2/2001 | Liao et al. |
| D440,863 S | 4/2001 | Worrall |
| 6,213,438 B1 | 4/2001 | Ostby et al. |
| 6,213,821 B1 | 4/2001 | Bernloehr et al. |
| 6,244,552 B1 | 6/2001 | Adams et al. |
| 6,264,152 B1 | 7/2001 | Bloch et al. |
| 6,273,382 B1 | 8/2001 | Pemberton |
| 6,336,037 B1 | 1/2002 | Sekine et al. |
| 6,340,146 B1 | 1/2002 | Tzeng |
| 6,347,776 B1 | 2/2002 | Chuang |
| 6,354,549 B2 | 3/2002 | Sweere et al. |
| 6,361,012 B1 | 3/2002 | Chang |
| 6,367,756 B1 | 4/2002 | Wang |
| 6,378,830 B1 | 4/2002 | Lu |
| 6,394,403 B1 | 5/2002 | Hung |
| 6,402,109 B1 | 6/2002 | Dittmer |
| 6,409,127 B1 | 6/2002 | VanderHeide et al. |
| D460,078 S | 7/2002 | Li |
| 6,416,027 B1 | 7/2002 | Hart |
| 6,418,010 B1 | 7/2002 | Sawyer |
| 6,419,196 B1 | 7/2002 | Sweere et al. |
| 6,450,467 B2 | 9/2002 | Timm |
| 6,453,509 B1 | 9/2002 | Shin |
| 6,478,275 B1 | 11/2002 | Huang |
| 6,484,987 B2 | 11/2002 | Weaver |
| 6,494,429 B2 | 12/2002 | Tajima |
| 6,517,040 B1 | 2/2003 | Wen |
| 6,530,546 B1 | 3/2003 | Cyrell |
| 6,543,734 B2 | 4/2003 | Yeh |
| 6,554,238 B1 | 4/2003 | Hibberd |
| 6,554,242 B2 | 4/2003 | Kim |
| 6,559,829 B1 | 5/2003 | Matsuo et al. |
| 6,560,094 B2 | 5/2003 | Schmidt |
| 6,565,056 B2 | 5/2003 | Lin |
| 6,575,419 B1 | 6/2003 | Masuda et al. |
| D477,606 S | 7/2003 | Theis et al. |
| 6,585,203 B1 | 7/2003 | Euker |
| 6,592,090 B1 | 7/2003 | Li |
| 6,594,143 B2 | 7/2003 | Yano et al. |
| 6,604,722 B1 | 8/2003 | Tan |
| 6,654,235 B2 | 11/2003 | Imsand |
| 6,663,064 B1 | 12/2003 | Minelli et al. |
| 6,671,928 B2 | 1/2004 | Huang |
| 6,672,553 B1 | 1/2004 | Lin |
| 6,752,363 B2 | 6/2004 | Boele |
| D493,800 S | 8/2004 | Pfister et al. |
| D494,596 S | 8/2004 | Pfister |
| D494,978 S | 8/2004 | Pfister |
| D495,713 S | 9/2004 | Pfister et al. |
| 6,905,101 B1 | 6/2005 | Dittmer |
| 6,923,413 B2 | 8/2005 | Dozier |
| 7,028,961 B1 | 4/2006 | Dittmer et al. |
| 7,036,787 B1 | 5/2006 | Lin |
| D530,595 S | 10/2006 | Lam et al. |
| 7,152,836 B2 * | 12/2006 | Pfister et al. ........... 248/292.14 |
| 7,178,775 B2 * | 2/2007 | Pfister et al. ........... 248/292.14 |
| D558,562 S | 1/2008 | Ciungan et al. |
| D558,563 S | 1/2008 | Ciungan |
| D558,564 S | 1/2008 | Ciungan |
| D559,088 S | 1/2008 | Ciungan |
| D562,113 S | 2/2008 | Ciungan et al. |
| 7,334,766 B2 * | 2/2008 | Ligertwood ............ 248/292.13 |
| D563,962 S * | 3/2008 | Grey ......................... D14/452 |
| 7,438,269 B2 * | 10/2008 | Pfister et al. ........... 248/292.14 |
| 7,513,469 B1 * | 4/2009 | Ciungan ..................... 248/161 |
| 7,513,474 B2 * | 4/2009 | Anderson et al. ......... 248/284.1 |
| 2001/0050327 A1 | 12/2001 | Sweere et al. |
| 2002/0011544 A1 | 1/2002 | Bosson |
| 2002/0033436 A1 | 3/2002 | Peng et al. |
| 2002/0084396 A1 | 7/2002 | Weaver |
| 2002/0179801 A1 | 12/2002 | Kim |
| 2002/0190180 A1 | 12/2002 | Cotterill |
| 2003/0075653 A1 | 4/2003 | Li |
| 2003/0136888 A1 | 7/2003 | Boele |
| 2003/0154673 A1 | 8/2003 | MacGregor et al. |
| 2003/0201372 A1 | 10/2003 | Dozier |
| 2003/0227739 A1 | 12/2003 | Kim et al. |
| 2004/0011932 A1 | 1/2004 | Duff |
| 2004/0011938 A1 | 1/2004 | Oddsen, Jr. |
| 2004/0211870 A1 | 10/2004 | Bremmon et al. |
| 2004/0232298 A1 | 11/2004 | Bremmon et al. |
| 2004/0232301 A1 | 11/2004 | Bremmon et al. |
| 2004/0245420 A1 | 12/2004 | Pfister et al. |
| 2005/0051688 A1 | 3/2005 | Dittmer |
| 2005/0133678 A1 | 6/2005 | Dittmer |
| 2005/0263659 A1 | 12/2005 | Pfister et al. |
| 2006/0006296 A1 * | 1/2006 | Morita ....................... 248/200 |
| 2006/0065800 A1 * | 3/2006 | Bremmon ................ 248/274.1 |
| 2006/0291152 A1 | 12/2006 | Bremmon |
| 2007/0023593 A1 * | 2/2007 | Fedewa ...................... 248/201 |
| 2007/0041150 A1 * | 2/2007 | Short et al. .................. 361/681 |
| 2007/0090250 A1 * | 4/2007 | O'Keene ................. 248/299.1 |
| 2007/0176067 A1 * | 8/2007 | Monaco .................. 248/284.1 |
| 2007/0262215 A1 * | 11/2007 | Tan ............................ 248/201 |
| 2008/0035813 A1 | 2/2008 | O'Keene et al. |
| 2008/0073471 A1 * | 3/2008 | Beger ....................... 248/309.1 |
| 2008/0156949 A1 * | 7/2008 | Sculler et al. ........... 248/220.21 |

| | | | | | | |
|---|---|---|---|---|---|---|
| 2008/0210837 | A1* | 9/2008 | Burns ............... 248/291.1 | KR | 0176089 | 4/2000 |
| 2008/0315049 | A1* | 12/2008 | Bailo et al. ......... 248/176.1 | KR | 2002-0071289 | 9/2002 |
| 2009/0050763 | A1* | 2/2009 | Dittmer ............... 248/284.1 | WO | WO 00/73697 | 12/2000 |
| 2009/0084918 | A1* | 4/2009 | Pfister et al. ........ 248/292.14 | | | |

FOREIGN PATENT DOCUMENTS

| | | |
|---|---|---|
| JP | 2-95279 | 7/1990 |
| JP | 2001-034180 | 2/2001 |
| JP | 2001-309276 | 11/2001 |
| KR | 1989-0001804 | 4/1989 |
| KR | 1990-0002291 | 3/1990 |
| KR | 1990-0003540 | 4/1990 |
| KR | 1992-0002567 | 4/1992 |

OTHER PUBLICATIONS

U.S. Appl. No. 12/503,718, filed Jul. 15, 2009, O'Keene.
U.S. Appl. No. 11/357,348, filed Feb. 17, 2006, O'Keene.
Assembly Instructions for Adjustable Tilt Wall Mounts; Peerless Industries, Inc. Mar. 17, 1993.
Assembly Instructions for Retrofit Kit for Peerless Products with Adjustable Tilt Tray, Peerless Industries, Inc. Feb. 14, 1995.

* cited by examiner

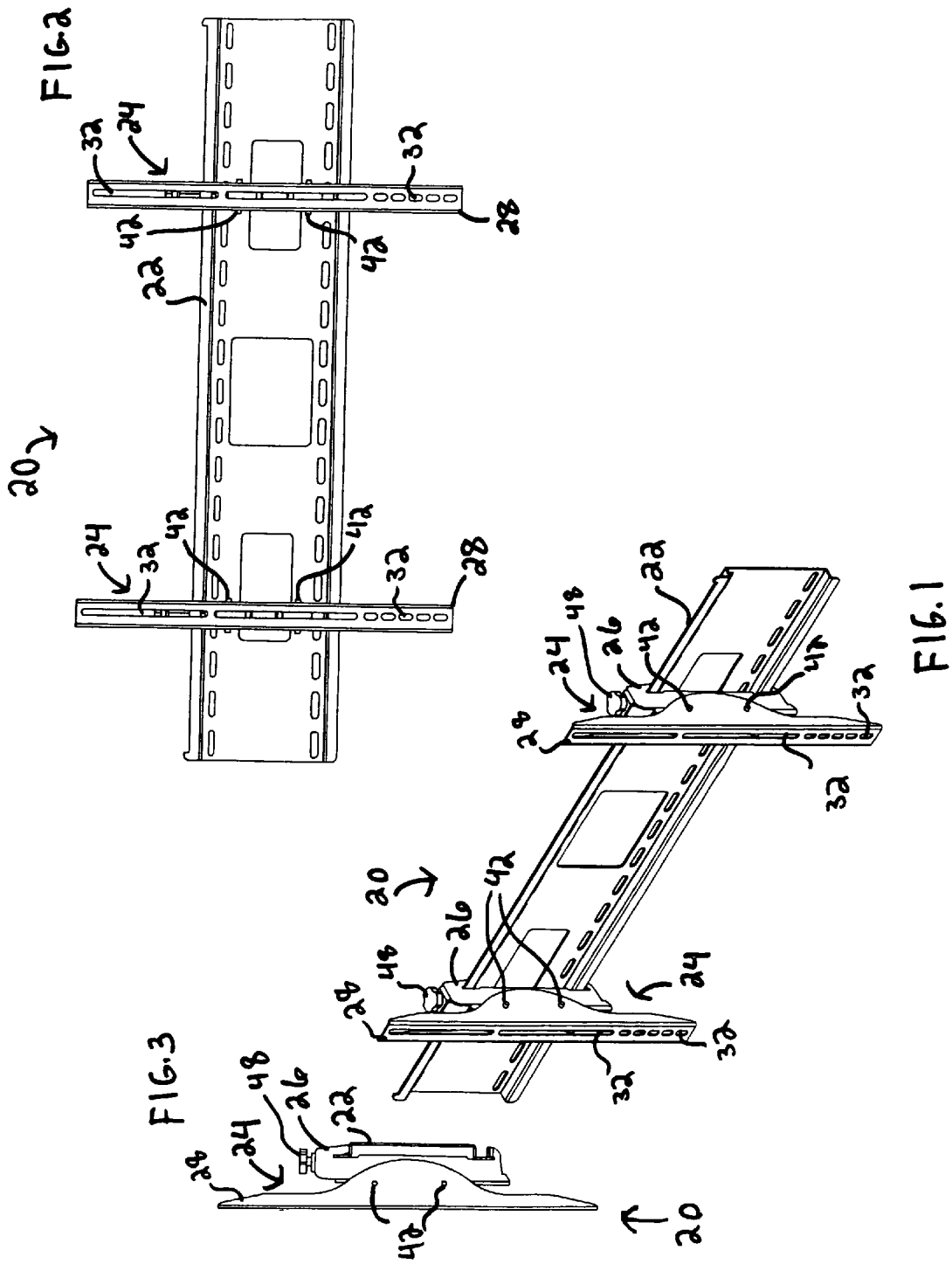

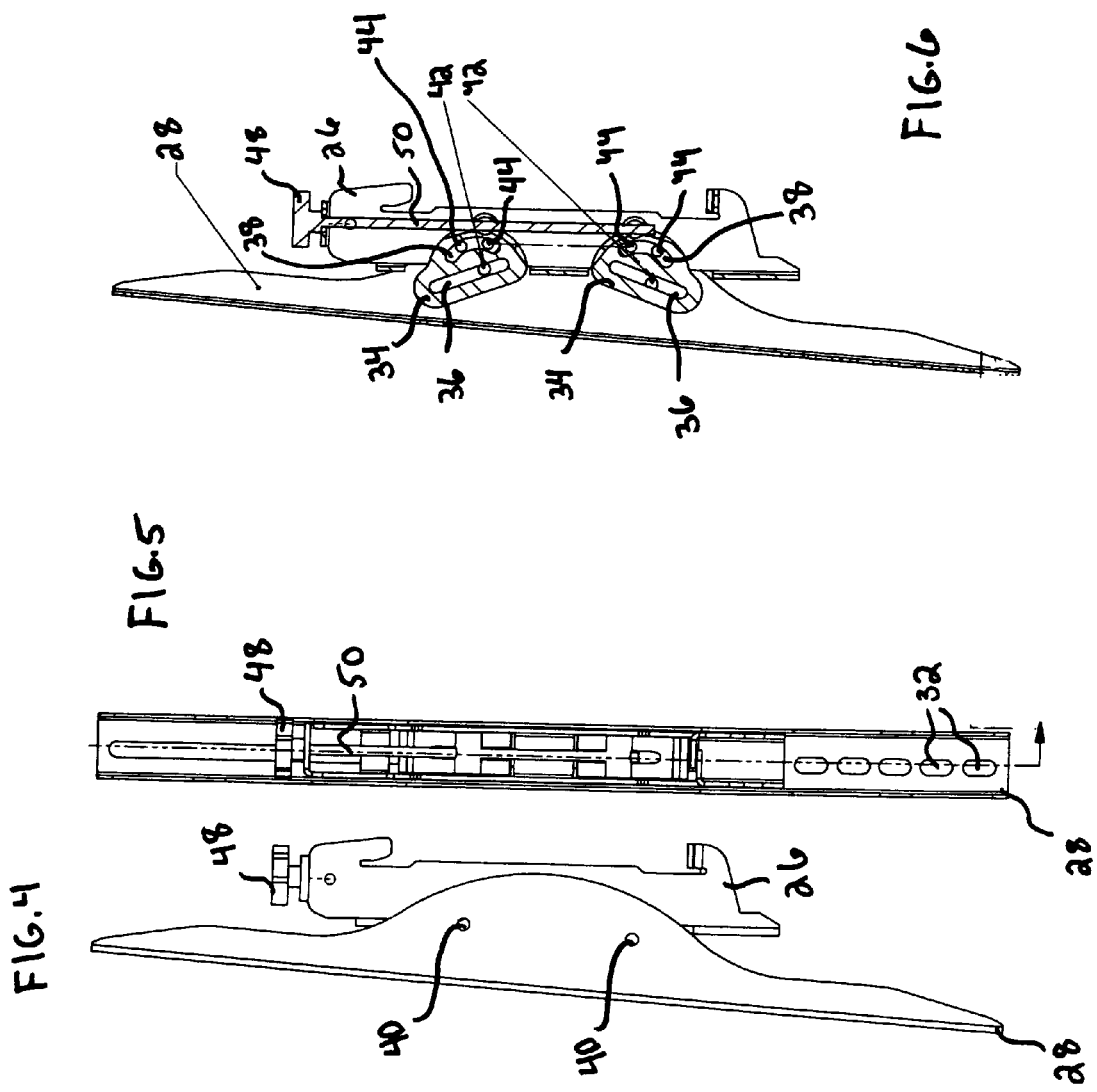

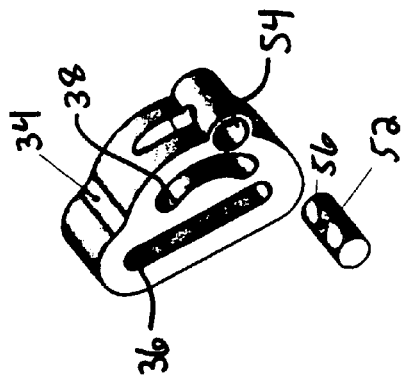
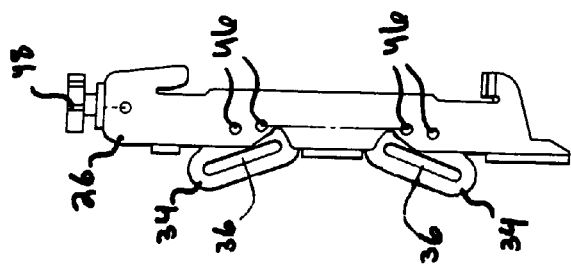
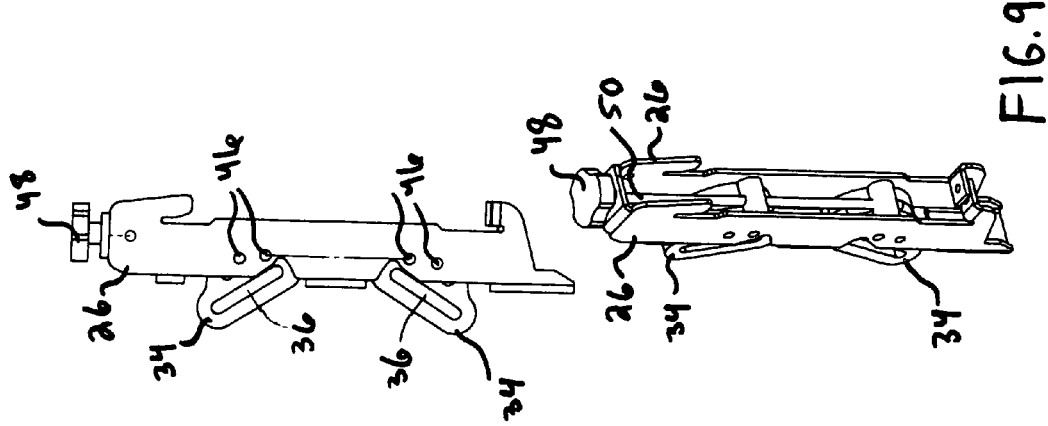

ADJUSTABLE TILT MOUNTING SYSTEM

CROSS-REFERENCE TO RELATED APPLICATIONS

The present application claims priority to U.S. Provisional Patent Application No. 60/899,071, filed Feb. 2, 2007 and incorporated herein by reference in its entirety.

FIELD OF THE INVENTION

The present invention relates generally to mounting systems. More particularly, the present invention relates to mounting systems that permit a device such as a flat panel display to be tilted at a variety of angles.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In recent years, flat-panel television units have become enormously popular in both the commercial and the residential sectors. As the prices for plasma and liquid crystal display (LCD) televisions have fallen, more and more businesses and individuals have purchased such devices both for business and home entertainment purposes.

One advantage of flat-panel television units is their relatively low thickness. Because conventional "tube" televisions have a relatively large depth, the display options for such devices are quite limited. In the residential setting, most users require a television stand or large entertainment center to store the television. Such stands or entertainment centers can take up significant floor space, which is often undesirable. In the commercial or educational setting, users will often install large overhead mounting systems that can contain the television. However, these systems usually require professional installation and, once the television is secured in the mount, it is often very difficult to access and adjust due to its height. With flat-panel televisions, however, users can simply mount the television directly to a wall or similar surface. Such arrangements eliminate the space-consuming floor stand and also take up less space than a ceiling mounted system, while also being more easily installable and adjustable by a user.

A number of adjustable flat panel wall mounting systems have been recently developed and commercialized, with such mounts enabling an attached flat panel television or similar display to tilt as needed. These mounts are typically manufactured in a variety of sizes, with smaller mounting systems being used to mount smaller devices and larger mounts being used to mount larger devices. However, this requires the manufacturer to design and develop mounts of multiple sizes, and installers and purchasers must choose the correct mount from several different mounts. This adds a level of complexity to everyone involved, while also increasing design and development costs for the manufacturer. It would therefore be desirable to provide a tilt mounting system that addresses these concerns.

SUMMARY OF THE INVENTION

Various embodiments of the present invention provide an improved tilt mounting system for mounting flat panel televisions and similar devices or displays. In various embodiments, at least one mounting bracket includes a plurality of guide mechanisms that are adjustable in orientation relative to each other. Each guide mechanism includes at least one guide structure therein, with each guide structure being oriented an angle relative to the other guide structure(s). When the guide mechanisms are adjusted, the angle between the guide structures changes. As the angle between the guide structures increases, the mounting system becomes more suitable for larger devices or display.

These and other features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 1 is a perspective view of a tilt mounting system constructed in accordance with one embodiment of the present invention;

FIG. 2 is a front view of the tilt mounting system of FIG. 1;

FIG. 3 is a side view of the tilt mounting system of FIG. 1;

FIG. 4 is a side view of the mounting bracket in the tilt mounting system of FIG. 1;

FIG. 5 is a front view of the mounting bracket of FIG. 4;

FIG. 6 is a section side view of the device mounting bracket of FIG. 4, taken along lines 5-5 of FIG. 5;

FIG. 7 is a side view of a device mounting bracket, in a first position, with the display portion removed;

FIG. 8 is a side view of the device mounting bracket of FIG. 7, in a second position, with the display portion removed;

FIG. 9 is a perspective view of the device mounting bracket of FIG. 7, with the display portion removed; and FIG. 10 is a perspective, exploded view of a guide mechanism/drive pin subcombination.

DETAILED DESCRIPTION OF THE PREFERRED EMBODIMENTS

FIGS. 1-3 show a tilt mounting system 20 constructed in accordance with one embodiment of the present invention. The tilt mounting system 20 comprises a surface mounting plate 22 and at least one mounting bracket 24. Each mounting bracket 24 comprises an adapter portion 26 and a display portion 28 which is movably associated with the adapter portion 26. In the embodiment shown in FIGS. 1-3, the adapter portion 26 is configured to attach to the surface mounting plate 22, which can be attached to a wall or similar surface. However, in other embodiments it is possible for the adapter portion 26 to be directly attachable to such a surface, or for the adapter portion 26 to be attachable to a larger support structure. Each display portion 28 is configured to attach to the back of a flat panel television or similar device or display unit via a plurality of openings 32 on the front surface thereof. A variety of types of fasteners may be used to couple the display portion 28 to the device or display via the openings 32.

FIGS. 4-9 show the configuration of the mounting bracket 24 in greater detail. In the embodiments shown in the figures, the adapter portion 26 and the display portion 28 are associated with each other via a plurality of guide mechanisms 34. Each guide mechanism 34 includes at least one primary guide structure 36 and at least one secondary guide structure 38. In the embodiment shown in the attached figures, both the primary guide structure 36 and the secondary guide structure 38 comprise slots, although other mechanisms may also be used. In the embodiment shown in the Figures, the primary guide structures 36 comprise slots that are substantially straight in nature. These slots are configured such that, when considering both of the guide mechanisms shown in FIGS. 4-9, the substantially straight slots are oriented at an angle to each other. At least one primary follower 42, each being a pin, for example, passes through each primary guide structure 36 and the display portion 28, with the primary follower 42 capable of moving within the respective primary guide structure 36. In the embodiment in the attached figures, the primary followers 42 are capable of rotating within display portion holes 40 formed within the display portion 28. It should be noted that although display portion holes 40 are shown in the attached figures, it is not necessary for the primary followers 42 to entirely pass through the walls of the display portion 28. For example, the inner walls of the display portion 28 could instead include channels within which the primary followers 42 rest. The movement of the primary followers 42 within the primary guide structures 36 permits the display portion 28 to tilt relative to the adapter portion 26, resulting in a tilting action for any attached flat panel display or other device.

In the embodiments shown in the attached figures, the secondary guide structures 38 formed within the guide mechanisms 34 comprise curved slots, each being substantially circular in nature. Once again, other types of mechanisms besides curved slots may also be used. At least one secondary follower 44, also in the forms of pins in one embodiment, is movably located within each of the secondary guide structures 38. In the embodiment shown in FIGS. 4-9, two secondary followers 44 are placed within each secondary guide structure 38, although other numbers of secondary followers 44 may also be used as necessary or desired. The secondary followers 44 also are associated with the adapter portion 26. In the embodiment shown in the attached figures, the secondary followers 44 pass through adapter portion holes 46 formed within the adapter portion 26. It should be noted, however, that other arrangements are possible. For example, the inner walls of the adapter portion 26 could instead include channels within which the secondary followers 44 rest. The combination of the guide mechanisms 34, the primary followers 42 and the secondary followers thereby operatively and movably connect the display portion 28 to the adapter portion 26.

As shown in FIGS. 4-9, the mounting bracket 24 also includes a drive mechanism for adjusting the orientation of the guide mechanisms 34 relative to each other. In the embodiment shown in FIGS. 4-9, an adjuster 48, a knob in this particular embodiment, is accessible by a user. The adjuster 48 is connected to a drive rod 50, which passes through the inside of the adapter portion 26, although the drive rod can be more closely associated with the display portion 28 as well. It is possible for the adjuster 48 and the drive rod 50 to be formed as one component or as separate components. The drive rod 50 passes through and interacts with drive pins 52, each of which is positioned within a guide mechanism channel 54 inside a guide mechanism 34.

As shown in FIG. 10, each drive pin 52 includes a threaded drive pin channel 56. The drive pin channels 56 are sized to threadedly engage the drive rod 50, which also is threaded along at least portions thereof. In the embodiment shown in FIGS. 4-9, one of the two drive pin channels 56 is reverse-threaded relative to the other drive pin channel 56.

The operation of the drive mechanism of FIGS. 4-9 is generally as follows. When the user turns the adjuster 48, the drive rod 50 proceeds to move about its major axis. This movement causes threaded portions of the drive rod 50 to interact with the threaded drive pin channels 56. This threaded interaction causes the drive pins 52 to move either up or down against its respective guide mechanism channel 54, causing each guide mechanism 34 to reorient itself either in a generally clockwise or generally counterclockwise direction. Because one of the drive pin channels 56 is reverse threaded relative to the threading of the other drive pin channel 56, the movement of the drive rod 50 ultimately causes one of the guide mechanisms 34 to reorient itself in a generally clockwise direction when the other guide mechanisms 34 reorients itself in a generally counterclockwise direction and vice versa (depending upon the direction in which the adjuster 48 is turned). The same process is repeated for each mounting bracket 24 in the mounting system 20.

In addition to the arrangement depicted in FIGS. 4-9 and discussed above, a wide variety of mechanisms may be used to adjust the orientations of the guide mechanisms 34 relative to each other. For example, but without limitation, mechanisms such as worm gears, levers, latches and slides may be used to independently or in tandem to adjust the orientations of the guide mechanisms 34. Other adjustment mechanisms may also be used.

By adjusting the orientations of the guide mechanisms 34 relative to each other, the angle defined by the primary guide structures 36 is altered. For example and in the embodiment shown in FIGS. 4-9, reorienting the higher of the two guide mechanisms 34 in the counterclockwise direction and the other guide mechanism 34 in the clockwise direction causes this angle to decrease, while the reverse reorientation of the guide mechanisms 34 causes the angle to increase. It has been determined that a smaller angle between the primary guide structures 36 provides improved continuous tilting capabilities for smaller flat panel displays and devices, while a larger angle between the primary guide structures provides improved continuous tilting capabilities for larger flat panel displays and devices. Therefore, when a user desires to mount a flat panel display or device to the mounting system 20, he or she simply adjusts the adjuster 48 for each mounting bracket 24 so that the angle between the primary guide structures 36 provides for an improved degree of continuous tilt for the particular display or device being mounted. Thereby, the mounting system 20 of FIGS. 1-9 is capable of being used to mount displays and devices of a wide variety of sizes.

In addition to the above, embodiments of the present invention can include a variety of features in addition to those discussed above. For example, in the event that an extra-large flat panel device or display is to be mounted, a number of extension brackets may be added to both the display portion 28 and the surface mounting plate 22. Examples of such extension brackets are used in the ONEMOUNT™ mounting system currently sold by Peerless Industries of Melrose Park, Ill. Installation and assembly instructions for the ONEMOUNT™ mounting system can be found at www.peerless-industries.com/pcattachments/INSTR%20SHEET-202-9167-1-3.PDF, and the content of this document is incorporated herein by reference.

Still further, various mechanisms may be used to impart friction on the mounting brackets 24. For example, a nut can be positioned within a wall of either the display portion 28 and the adapter portion 26, and pressure can be exerted on a washer, located on the outside of the other of the display portion 28 and the adapter portion 26 to increase the frictional resistance between the display portion 28 and the adapter portion 26, thereby making it more difficult to adjust the display portion 28 relative to the adapter portion 26. A screw or similar component can pass through the washer and nut in order to adjust the amount of frictional resistance that is being imparted. Other types of friction-inducing assemblies may also be used. Additionally, mechanisms such as pins and screws for selectively locking the position of the display portion 28 relative to the adapter portion 26 may also be incorporated to the mounting system 20 of FIGS. 1-9.

The foregoing description of embodiments of the present invention have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated.

What is claimed is:

1. A mounting system, comprising:
    an adapter portion;
    a display portion configured to operatively connect to a display;
    a plurality of moveable guide mechanisms operatively connecting the adapter portion to the display portion, the plurality of moveable guide mechanisms each including a primary guide structure, the primary guide structure including at least one primary follower which is movable within the respective primary guide structure, the primary guide structures of the plurality of moveable guide mechanisms defining an angle therebetween; and
    an adjustment assembly operatively connected to the plurality of moveable guide mechanisms,
    wherein an adjustment of the adjustment assembly causes at least one of the plurality of moveable guide mechanisms to move in relation to the display portion, thereby causing the angle defined by the primary guide structures to be changed, and wherein movement of the at least one primary follower within each primary guide structure enables the display portion to tilt relative to the adapter portion.

2. The mounting system of claim 1, wherein each of the plurality of moveable guide mechanisms include a secondary guide structure including at least one secondary follower movably positioned therein, and wherein movement of the at least one secondary follower within each secondary guide structure enables the orientation of the respective moveable guide mechanism to be altered relative to the adapter portion.

3. The mounting system of claim 1, wherein the adjustment of the adjustment assembly causes the plurality of moveable guide mechanisms to reorient themselves in substantially different directions.

4. The mounting system of claim 1, wherein the adjustment assembly comprises:
    an adjustment rod; and
    a plurality of drive pins threadedly engaging the adjustment rod, each of the plurality of drive pins operatively connected to a respective moveable guide mechanism.

5. The mounting system of claim 4, wherein one of the plurality of drive pins is reverse threaded relative to another of the plurality of drive pins.

6. The mounting system of claim 4, wherein each moveable guide mechanism includes a guide mechanism channel, the guide mechanism channel housing one of the plurality of drive pins.

7. The mounting system of claim 4, wherein the adjustment assembly further comprises an adjuster actuable by the user, and wherein the actuation of the adjuster causes an adjustment of the adjustment rod to adjust the angle defined by the primary guide structures.

8. The mounting system of claim 1, further comprising a support structure engaging the adapter portion, the support structure configured to attach to a surface.

9. The mounting system of claim 8, wherein the support structure comprises a wall plate.

10. A display system, comprising:
    a display unit;
    a display portion configured to operatively connect to the display unit;
    an adapter portion configured to operatively connect to the display portion;
    a plurality of guide mechanisms operatively connecting the adapter portion to the display portion, the plurality of guide mechanisms each including a primary guide structure, the primary guide structures of the plurality of guide mechanisms defining an angle therebetween; and
    an adjustment assembly directly linked to and moveably interfacing with each of the plurality of guide mechanisms,
    wherein an adjustment of the adjustment assembly causes the angle defined by the primary guide structures to be changed; and wherein each of the primary guide structures includes at least one primary follower which are movable within the respective primary guide structure, and wherein movement of the at least one primary follower within each primary guide structure enables the display portion to tilt relative to the adapter portion.

11. A display system, comprising:
    a display unit;
    a display portion configured to operatively connect to the display unit;
    an adapter portion configured to operatively connect to the display portion;
    a plurality of guide mechanisms operatively connecting the adapter portion to the display portion, the plurality of guide mechanisms each including a primary guide structure, the primary guide structures of the plurality of guide mechanisms defining an angle therebetween; and
    an adjustment assembly directly linked to and moveably interfacing with each of the plurality of guide mechanisms,
    wherein an adjustment of the adjustment assembly causes the angle defined by the primary guide structures to be changed, and wherein each of the plurality of guide mechanisms include a secondary guide structure including at least one secondary follower movably positioned therein, and wherein movement of the at least one secondary follower within each secondary guide structure enables the orientation of the respective guide mechanism to be altered relative to the adapter portion.

12. A display system, comprising:
    a display unit;
    a display portion configured to operatively connect to the display unit;
    an adapter portion configured to operatively connect to the display portion;
    a plurality of guide mechanisms operatively connecting the adapter portion to the display portion, the plurality of guide mechanisms each including a primary guide structure, the primary guide structures of the plurality of guide mechanisms defining an angle therebetween; and
    an adjustment assembly directly linked to and moveably interfacing with each of the plurality of guide mechanisms, the adjustment assembly comprising an adjustment rod and a plurality of drive pins threadedly engaging the adjustment rod, each of the plurality of drive pins operatively connected to a respective guide mechanism wherein an adjustment of the adjustment assembly causes the angle defined by the primary guide structures to be changed.

13. The display system of claim 12, wherein one of the plurality of drive pins is reverse threaded relative to another of the plurality of drive pins.

14. The display system of claim 12, wherein each guide mechanism includes a guide mechanism channel, the guide mechanism channel housing one of the plurality of drive pins.

15. The display system of claim 12, wherein the adjustment assembly further comprises an adjuster actuable by the user, and wherein the actuation of the adjuster causes an adjustment of the adjustment rod to adjust the angle defined by the primary guide structures.

16. A mounting system, comprising:
an adapter portion characterized by a longitudinal axis;
a display portion configured to operatively connect to a display;
first and second primary guide structures operatively connecting the display portion to the adapter portion and defining an angle therebetween; and
an adjustment assembly orientated substantially parallel to the longitudinal axis and operatively connected to at least one of the first and second primary guide structures,
wherein an adjustment of the adjustment assembly causes the angle defined by the primary guide structures to be changed.

17. The mounting system of claim 16, wherein the adjustment assembly is operatively connected to both the first and second primary guide structures.

18. The mounting system of claim 16, wherein the adjustment of the adjustment assembly causes both the first and second primary guide structures to be reoriented.

19. The mounting system of claim 16, wherein the first and second primary guide structures are included in separate guide mechanisms, the guide mechanisms defining components separate from the adapter portion and the display portion.

20. The mounting system of claim 19, wherein the first and second primary guide structures each include at least one primary follower which are movable within the respective primary guide structure, and wherein movement of the at least one primary follower within each primary guide structure enables the display portion to tilt relative to the adapter portion.

21. The mounting system of claim 19, wherein each of the guide mechanisms include a secondary guide structure including at least one secondary follower movably positioned therein, and wherein movement of the at least one secondary follower within each secondary guide structure enables the orientation of the respective guide mechanism to be altered relative to the adapter portion.

22. The mounting system of claim 16, wherein the adjustment assembly comprises:
an adjustment rod; and
at least one drive pins threadedly engaging the adjustment rod, the at least one drive pin operatively connected to a respective primary guide structure.

23. The mounting system of claim 22, wherein the first and second primary guide structures each comprise a substantially straight slot.

24. A mounting system, comprising:
an adapter portion;
a display portion configured to operatively connect to a display;
a plurality of guide mechanisms operatively connecting the adapter portion to the display portion, the plurality of guide mechanisms each including a primary guide structure and a secondary guide structure, the primary guide structures of the guide mechanisms defining an angle therebetween, and secondary guide structure including at least one secondary follower movably positioned therein; and
an adjustment assembly operatively connected to the plurality of guide mechanisms,
wherein an adjustment of the adjustment assembly causes the angle defined by the primary guide structures to be changed, and wherein movement of the at least one secondary follower within each secondary guide structures enables the orientation of the respective guide mechanism to be altered relative to the adapter portion.

25. The mounting system of claim 24, wherein the adjustment of the adjustment assembly causes the plurality of guide mechanisms to reorient themselves in substantially different directions.

26. A mounting system, comprising:
an adapter portion;
a display portion configured to operatively connect to a display;
a plurality of guide mechanisms operatively connecting the adapter portion to the display portion, the plurality of guide mechanisms each including a primary guide structure, the primary guide structures of the guide mechanisms defining an angle therebetween; and
an adjustment assembly operatively connected to the plurality of guide mechanisms, the adjustment assembly including an adjustment rod and a plurality of drive pins threadedly engaging the adjustment rod, each of the plurality of drive pins operatively connected to a respective guide mechanism,
wherein an adjustment of the adjustment assembly causes the angle defined by the primary guide structures to be changed.

27. The mounting system of claim 26, wherein one of the plurality of drive pins is reverse threaded relative to another of the plurality of drive pins.

28. The mounting system of claim 26, wherein each guide mechanism includes a guide mechanism channel, the guide mechanism channel housing one of the plurality of drive pins.

29. The mounting system of claim 26, wherein the adjustment assembly further comprises an adjuster actuable by the user, and wherein the actuation of the adjuster causes an adjustment of the adjustment rod to adjust the angle defined by the primary guide structures.

* * * * *